(12) United States Patent
Mori

(10) Patent No.: US 9,924,250 B2
(45) Date of Patent: *Mar. 20, 2018

(54) SOUND-TRANSMITTING STRUCTURE, SOUND-TRANSMITTING MEMBRANE, AND WATERPROOF CASE

(71) Applicant: NITTO DENKO CORPORATION, Ibaraki-shi, Osaka (JP)

(72) Inventor: Masaaki Mori, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 27 days.

This patent is subject to a terminal disclaimer.

(21) Appl. No.: 14/646,328

(22) PCT Filed: Oct. 28, 2013

(86) PCT No.: PCT/JP2013/006351
§ 371 (c)(1),
(2) Date: May 20, 2015

(87) PCT Pub. No.: WO2014/080574
PCT Pub. Date: May 30, 2014

(65) Prior Publication Data
US 2015/0304750 A1 Oct. 22, 2015

(30) Foreign Application Priority Data

Nov. 21, 2012 (JP) .................................. 2012-255236
May 27, 2013 (JP) .................................. 2013-111285

(51) Int. Cl.
*H04R 1/02* (2006.01)
*H04R 1/08* (2006.01)
(Continued)

(52) U.S. Cl.
CPC ............. *H04R 1/023* (2013.01); *B32B 5/022* (2013.01); *B32B 27/12* (2013.01); *B32B 27/322* (2013.01);
(Continued)

(58) Field of Classification Search
CPC ............. B32B 5/022; B32B 2307/726; B32B 2307/51; B32B 2262/0284; G10K 11/168;
(Continued)

(56) References Cited

U.S. PATENT DOCUMENTS 4,071,040 A 1/1978 Moriarty
4,360,711 A * 11/1982 Steiner .................. H04R 11/00
29/594

(Continued)

FOREIGN PATENT DOCUMENTS

EP 2335505 6/2011
JP 10165787 6/1998
(Continued)

OTHER PUBLICATIONS

International Search Report issued in International Application No. PCT/JP2013/006351, dated Jan. 21, 2014, 4 pages.
(Continued)

*Primary Examiner* — Norman Yu
(74) *Attorney, Agent, or Firm* — Hamre, Schumann, Mueller & Larson, P.C.

(57) ABSTRACT

The sound-transmitting structure (100) of the present invention includes a sound-transmitting membrane (1) that allows passage of sounds and prevents passage of foreign matters and a case (120) having a sound-transmitting opening (122). This sound-transmitting membrane (1) includes a supporting member (12) that is a nonwoven fabric containing an elastomer and a porous resin membrane (11) disposed on the supporting member (12) and containing polytetrafluoroeth-
(Continued)

ylene as a main component. The sound-transmitting membrane (1) covers the sound-transmitting opening (122) with the supporting member (12) welded to the case (120).

3 Claims, 11 Drawing Sheets

(51) Int. Cl.
  *B32B 5/02* (2006.01)
  *B32B 27/12* (2006.01)
  *B32B 27/32* (2006.01)

(52) U.S. Cl.
  CPC ........ *H04R 1/086* (2013.01); *B32B 2305/026* (2013.01); *B32B 2307/10* (2013.01); *B32B 2307/4026* (2013.01); *B32B 2307/412* (2013.01); *B32B 2307/51* (2013.01); *B32B 2307/724* (2013.01); *B32B 2457/00* (2013.01); *H04R 2499/11* (2013.01)

(58) Field of Classification Search
  CPC .... G10K 11/18; G10K 15/00; H04R 2499/11; H04R 1/023; H04R 1/086; H04R 1/44; H04R 1/02; H04R 7/125; H04R 1/42; H04B 2001/3894
  USPC ................ 381/334; 181/294, 296, 292, 290; 442/327, 394, 319
  See application file for complete search history.

(56) References Cited

U.S. PATENT DOCUMENTS

| | | | |
|---|---|---|---|
| 4,949,386 A | 8/1990 | Hill | |
| 4,987,597 A | 1/1991 | Haertl | |
| 5,412,162 A | 5/1995 | Kindel | |
| 5,828,012 A | 10/1998 | Repolle et al. | |
| 6,512,834 B1 | 1/2003 | Banter et al. | |
| 6,893,711 B2 | 5/2005 | Williamson et al. | |
| 6,932,187 B2 | 8/2005 | Banter et al. | |
| 8,431,204 B2 | 4/2013 | Ueki et al. | |
| 8,739,926 B1 | 6/2014 | Mori | |
| 2004/0102125 A1* | 5/2004 | Morman | B32B 5/00 |
| | | | 442/394 |
| 2005/0220448 A1 | 10/2005 | Tei et al. | |
| 2009/0320979 A1 | 12/2009 | Keleny et al. | |
| 2010/0206660 A1 | 8/2010 | Horie et al. | |
| 2010/0247857 A1* | 9/2010 | Sanami | H04M 1/18 |
| | | | 428/138 |
| 2010/0303270 A1 | 12/2010 | Parkins | |
| 2011/0188247 A1 | 8/2011 | Huang et al. | |
| 2013/0032285 A1 | 2/2013 | Mietta et al. | |

FOREIGN PATENT DOCUMENTS

| | | |
|---|---|---|
| JP | 2003-503991 | 1/2003 |
| JP | 2003-053872 | 2/2003 |
| JP | 2003-250188 | 9/2003 |
| JP | 2004-083811 | 3/2004 |
| JP | 2005-001272 | 1/2005 |
| JP | 2009-044731 | 2/2009 |
| JP | 2009-111993 | 5/2009 |
| JP | 2010-004397 | 1/2010 |
| JP | 2012-025160 | 2/2012 |
| WO | 01/03468 | 1/2001 |
| WO | 2011/132062 | 10/2011 |

OTHER PUBLICATIONS

Extended European Search Report for European Application No. 13857064.3, dated Oct. 17, 2016, 7 pages.

* cited by examiner

SOUND-TRANSMITTING STRUCTURE, SOUND-TRANSMITTING MEMBRANE, AND WATERPROOF CASE

TECHNICAL FIELD

The present invention relates to a sound-transmitting membrane, a sound-transmitting structure including a sound-transmitting membrane, and a waterproof case including a sound-transmitting membrane.

BACKGROUND ART

In recent years, electronic devices, such as mobile phones, laptop computers, electronic notebooks, digital cameras, and game machines, generally have audio functions. A sound emitter such as a speaker and a buzzer, or a sound receiver such as a microphone, is disposed inside a housing of an electronic device having audio functions. An opening is provided in the housing of the electronic device at a position corresponding to the sound emitter or the sound receiver. Sounds are transmitted through the opening. In addition, in order to prevent foreign matters such as water droplets from entering the housing of the electronic device, a sound-transmitting membrane that allows passage of sounds and prevents passage of foreign matters is disposed so as to cover the opening.

A known sound-transmitting membrane is a porous plastic membrane produced by forming pores in a polytetrafluoroethylene (hereinafter, sometimes referred to as "PTFE") film or an ultrahigh molecular weight polyethylene film (see Patent Literature 1).

Patent Literature 1 proposes a sound-transmitting membrane including a porous plastic membrane and a support bonded to the porous plastic membrane, in view of ease of secondary processing of the sound-transmitting membrane, such as cutting, punching, and bonding to a case. Nets, nonwoven fabrics, and woven fabrics are mentioned as examples of the support. Patent Literature 1 also proposes a sound-transmitting membrane including a porous plastic membrane and a support bonded to the porous plastic membrane and having a surface density within a predetermined range in order to prevent a decrease in the sound transmissibility of the sound-transmitting membrane.

Patent Literature 2 proposes a waterproof sound-transmitting membrane as a layered product composed of a plastic membrane and a support. Porous materials such as nets, foam rubbers, and sponge sheets, nonwoven fabrics, and woven fabrics, are mentioned as examples of the support.

Patent Literature 3 proposes an acoustic part having a waterproof filter (waterproof sound-transmitting membrane) attached to a housing so as to cover a sound-transmitting hole of the housing with an adhesive layer interposed between the filter and the housing.

CITATION LIST

Patent Literature

Patent Literature 1: JP 2003-53872 A
Patent Literature 2: JP 2004-83811 A
Patent Literature 3: JP 2010-4397 A

SUMMARY OF INVENTION

Technical Problem

In any Patent Literature mentioned above, the acoustic characteristics of a sound-transmitting membrane using a nonwoven fabric as a support are not specifically discussed. In particular, the acoustic characteristics for a high-frequency range (for example, 3000 Hz) are not discussed at all.

It is an object of the present invention to provide a sound-transmitting structure or a waterproof case including a sound-transmitting membrane that uses a nonwoven fabric as a support and exhibits good acoustic characteristics for a high-frequency range. It is another object of the present invention to provide a sound-transmitting membrane having excellent liquid repellency or durability in addition to good acoustic characteristics.

Solution to Problem

The present invention provides a sound-transmitting structure including: a sound-transmitting membrane that allows passage of sounds and prevents passage of foreign matters, the sound-transmitting membrane including: a supporting member that is a nonwoven fabric containing an elastomer and a porous resin membrane disposed on the supporting member and containing polytetrafluoroethylene as a main component; and a case having a sound-transmitting opening. The sound-transmitting membrane covers the sound-transmitting opening with the supporting member welded to the case.

The present invention also provides a sound-transmitting membrane that allows passage of sounds and prevents passage of foreign matters, the sound-transmitting membrane including: a supporting member that is a nonwoven fabric containing an elastomer; and a porous resin membrane disposed on the supporting member and containing polytetrafluoroethylene as a main component. The surface of the supporting member is coated with a liquid-repellent agent.

The present invention also provides a sound-transmitting membrane that allows passage of sounds and prevents passage of foreign matters, the sound-transmitting membrane including: a supporting member that is a nonwoven fabric containing an elastomer; and a porous resin membrane disposed on the supporting member and containing polytetrafluoroethylene as a main component. The sound-transmitting membrane has a recovery rate R of 80% or more. The recovery rate R is defined by the following formula:

$$\text{Recovery rate } R=(1-(H2/H1))\times 100,$$

where H1 is a maximum displacement of the sound-transmitting membrane from a reference plane, as measured after the sound-transmitting membrane having a peripheral portion attached to a plate so as to cover a through hole formed in the plate is subjected to a continuous water pressure of 50 kPa applied for 60 minutes to one surface of the sound-transmitting membrane attached to the plate, and H2 is a maximum displacement of the sound-transmitting membrane from the reference plane, as measured after the sound-transmitting membrane is allowed to stand at atmospheric pressure for 360 minutes following the application of the water pressure, the reference plane being a plane of the other surface of the sound-transmitting membrane including the peripheral portion.

The present invention further provides a waterproof case including: a sound-transmitting membrane that allows passage of sounds and prevents passage of foreign matters, the sound-transmitting membrane including: a supporting member that is a nonwoven fabric containing an elastomer; and a porous resin membrane disposed on the supporting member and containing polytetrafluoroethylene as a main component; and a case including: a frame having a sound-transmitting opening and an operation opening; and an elastic transparent film attached to the frame so as to cover the operation opening. The sound-transmitting membrane is attached to the case so as to cover the sound-transmitting opening.

Advantageous Effects of Invention

The sound-transmitting membrane using, as a supporting member, a nonwoven fabric containing an elastomer can reduce the insertion loss for sounds of 3000 Hz, compared to sound-transmitting membranes using other types of nonwoven fabrics as supporting members. Therefore, a sound-transmitting structure and a waterproof case each including the sound-transmitting membrane exhibiting good acoustic characteristics for a high-frequency range can be provided. In the sound-transmitting structure of the present invention, the sound-transmitting opening is covered with the supporting member welded to the case. Therefore, there is no need to provide an adhesive layer between the sound-transmitting membrane and the case. According to the waterproof case of the present invention, when an electronic device such as a mobile phone is set in the waterproof case, the electronic device can be used even in environments that require the device to be waterproof. In addition, the electronic device can be operated through the elastic transparent film attached to the frame so as to cover the operation opening. In a sound-transmitting membrane of the first aspect of the present invention, the surface of the supporting member is coated with a liquid-repellent agent. Therefore, the sound-transmitting membrane has excellent liquid repellency. Furthermore, according to a sound-transmitting membrane of another aspect of the present invention, even if it is deformed under water pressure, it is likely to recover from the deformation after being released from the water pressure. Therefore, the sound-transmitting membrane can be reused even after being repeatedly subjected to water pressure and thus has excellent durability.

DESCRIPTION OF EMBODIMENTS

Hereinafter, embodiments of the present invention will be described with reference to the drawings. The following description is merely illustrative of the present invention, and the present invention is not limited to the following description.

Figure 1:
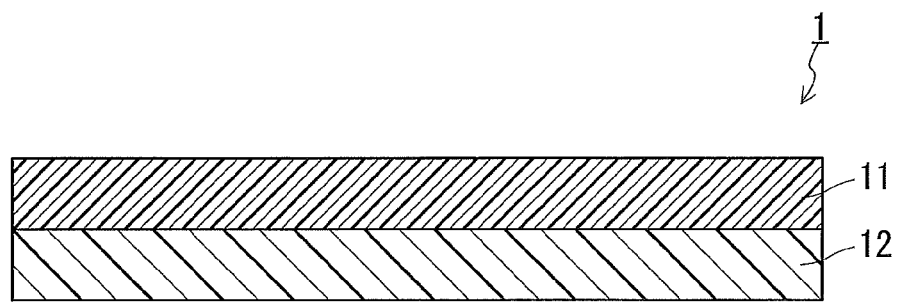
FIG. 1 is a cross-sectional view of an embodiment of a sound-transmitting membrane of the present invention.

As shown in FIG. 1, a sound-transmitting membrane 1 of the present embodiment includes a supporting member 12 and a porous resin membrane 11 containing PTFE as a main component. In the present description, the "main component" means a component whose content is the largest in terms of mass ratio. The porous resin membrane 11 is disposed on the supporting member 12. The supporting member 12 is formed of a nonwoven fabric containing an elastomer. Since the porous resin membrane 11 has a porous structure, the sound-transmitting membrane 1 has the properties of preventing passage of foreign matters such as water and dust and allowing permeation of gases. In addition, the sound-transmitting membrane 1 allows passage of sounds. Therefore, for example, in a housing having an opening corresponding to a sound emitter or a sound receiver of an electronic device, the sound-transmitting membrane 1 is placed over that opening and is suitably used to ensure the sound transmissibility, waterproof property, and dustproof property at the opening.

For example, the porous resin membrane 11 can be produced as follows: a kneaded product of a PTFE fine powder and a forming aid is formed into a sheet by extrusion molding and rolling; the forming aid is removed to obtain a sheet-shaped body; and then the sheet-shaped body is stretched. The porous resin membrane 11 thus produced has a porous structure in which innumerable spaces formed between fine fibers (fibrils) of PTFE serve as pores. The average pore diameter and porosity of the porous structure of the porous resin membrane 11 can be adjusted by changing the conditions for stretching of the sheet.

From the standpoint of ensuring both the waterproof or dustproof property and the sound transmissibility, the average pore diameter of the porous resin membrane 11 is preferably 1 µm or less, more preferably 0.7 µm or less, and even more preferably 0.5 µm or less. The lower limit of the average pore diameter of the porous resin membrane 11 is not particularly limited, and is, for example, 0.1 µm. Here, the "average pore diameter" of the porous resin membrane 11 can be measured according to the standards specified in ASTM (American Society for Testing and Materials) F316-86, and can be measured using, for example, a commercially-available measurement apparatus (e.g., Perm-Porometer manufactured by Porous Materials, Inc.) capable of automatic measurement according to the standards.

From the standpoint of sound transmissibility, the surface density of the porous resin membrane 11 is preferably 2 to 10 g/m$^2$, more preferably 2 to 8 g/m$^2$, and even more preferably 2 to 5 g/m$^2$.

The porous resin membrane 11 may be subjected to coloring treatment.

The main component of the porous resin membrane 11 is PTFE, and therefore, the intrinsic color of the porous resin membrane 11 is white. Accordingly, the porous resin membrane 11 is conspicuous when disposed to cover an opening of a housing. Therefore, if the porous resin membrane 11 is subjected to coloring treatment according to the color of the housing, it is possible to provide the porous resin membrane 11 that is less conspicuous when disposed in the housing. For example, the porous resin membrane 11 is colored black.

The porous resin membrane 11 may be subjected to liquid-repellent treatment. In this case, a porous membrane having excellent water-repellent performance or oil-repellent performance can be provided. Such a porous membrane is suitable for use as, for example, a waterproof sound-transmitting membrane. The liquid-repellent treatment can be performed by a known method. A liquid-repellent agent used for the liquid-repellent treatment is not particularly limited, and is typically a material containing a polymer having perfluoroalkyl groups.

It is only necessary that the supporting member 12 is flexible to the extent that the sound transmission mechanism triggered by vibration of the porous resin membrane 11 is not impaired. The elastomer of the supporting member 12 is desirably a thermoplastic elastomer. Examples of the thermoplastic elastomer include styrene-based thermoplastic elastomers (SBC), olefin-based thermoplastic elastomers (TPO), vinyl chloride-based thermoplastic elastomers (TPVC), urethane-based thermoplastic elastomers (TPU), ester-based thermoplastic elastomers (TPEE), and amide-based thermoplastic elastomers (TPAE). Specific examples include styrene-butadiene-styrene block copolymers (SBS), styrene-isoprene-styrene block copolymers (SIS), ethylene vinyl acetate elastomers (EVA), polyamide elastomers, and polyurethane elastomers. The supporting member 12 may be formed of a nonwoven fabric made of an elastomer. Favorably, the elastomer of the supporting member 12 contains at least one selected from an ethylene vinyl acetate elastomer, a polyurethane elastomer, and a polyamide elastomer.

For example, the supporting member 12 can be obtained by the method described below. An elastomer material having been heated and molten is applied in fibrous form onto a release film to form a nonwoven fabric. The release film provides a flat surface for the application of the elastomer material. The release film is not particularly limited, and it is favorable to use a film made of a resin such as silicone and polyethylene terephthalate. For example, an EVA resin is applied by being sprayed onto the release film at a high temperature (170° C. to 200° C.) and a high pressure (2 to 5 kg/cm$^2$). If an elastomer material is applied in this manner, a nonwoven fabric having a uniform thickness can easily be formed on the release film. The supporting member 12 can be obtained by removing the nonwoven fabric from the release film.

The supporting member 12 may be subjected to liquid-repellent treatment. This means that the surface of the supporting member 12 may be coated with a liquid-repellent agent. Thereby, even if the sound-transmitting membrane 1 is disposed in such a manner that the supporting member 12 is exposed to the outside, adhesion of water or oil to the sound-transmitting membrane 1 can be suppressed.

The liquid-repellent agent is not particularly limited. The liquid-repellent agent contains, for example, a linear fluorine-containing hydrocarbon group represented by —R$^1$C$_5$F$_{10}$CH$_2$C$_4$F$_9$ or —R$^2$C$_6$F$_{13}$. R$^1$ and R$^2$ are each independently an alkylene group having 1 to 12 carbon atoms or a phenylene group. Examples of the liquid-repellent agent include a polymer formed from a compound represented by CH$_2$=CR$^3$COOR$^1$C$_5$F$_{10}$CH$_2$C$_4$F$_9$ or CH$_2$=CR$^4$COOR$^2$C$_8$F$_{13}$, and the compound is at least one of monomers for the polymer and is an example of the linear fluorine-containing hydrocarbon group. R$^1$ and R$^2$ are each as described above, and R$^3$ and R$^4$ are each independently a hydrogen atom or a methyl group. When high liquid repellency is required, it is desirable that the liquid-repellent agent be a polymer formed from a compound represented by CH$_2$=CR$^3$COOR$^1$C$_5$F$_{10}$CH$_2$C$_4$F$_9$ or CH$_2$=C(CH$_3$)COOR$^2$C$_6$F$_{13}$, and the compound be at least one of monomers for the polymer and be an example of the linear fluorine-containing hydrocarbon group.

The above-mentioned polymer may be formed by polymerizing only the above type of monomer, but may be formed by copolymerizing the above type of monomer with another type of monomer. Examples of the monomer to be copolymerized with the above type of monomer include various (meth)acrylic monomers, but are not limited to the (meth)acrylic monomers. Any of various monomers having ethylenically unsaturated bonds, such as tetrafluoroethylene, may be used. However, when the monomers are copolymerized to form a copolymer, the ratio of the above type of monomer to all the monomers in the copolymer is desirably 60 mol % or more, and particularly desirably 90 mol % or more in order to avoid any difficulty in imparting liquid repellency. The polymerization of the above type of monomer can be performed according to a known polymerization method for acrylic monomers, and can be carried out by solution polymerization or emulsion polymerization. The average molecular weight of the above-mentioned polymer is not particularly limited, and is, for example, about 1000 to 500000 in terms of the number average molecular weight.

Examples of the method for coating the surface of the supporting member 12 with the liquid-repellent agent include a method of immersing the supporting member 12 in a solution prepared by dissolving the liquid-repellent agent in a solvent, and a method of applying or spraying this solution onto the supporting member 12.

The supporting member 12 and the porous resin membrane 11 obtained as described above are joined together by, for example, hot pressing, and thus the sound-transmitting membrane 1 can be obtained. The porous resin membrane 11 and the supporting member 12 may also be subjected to liquid-repellent treatment by immersing, in a solution containing a liquid repellent agent given as an example of the liquid repellent agent for the supporting member 12, the sound-transmitting membrane 1 obtained by joining the porous resin membrane 11 and the supporting member 12 before they are subjected to liquid-repellent treatment. Thereby, the surface of the supporting member 12 can be coated with the liquid-repellent agent. From the standpoint of the sound transmissibility, the surface density of the sound-transmitting membrane 1 is preferably 5 to 50 g/m$^2$, more preferably 5 to 30 g/m$^2$, and even more preferably 5 to 15 g/m$^2$.

As to the insertion loss, the sound-transmitting membrane 1 exhibits such acoustic characteristics that the insertion loss for sounds of 3000 Hz is 5 dB or less. Therefore, the sound-transmitting membrane 1 exhibits such good acoustic characteristics that the insertion loss is low in a relatively high frequency range, even though the sound-transmitting membrane 1 has a multilayer structure in which the porous resin membrane 11 is disposed on the supporting member 12 including a nonwoven fabric. Here, the insertion loss means a difference in sound pressure level between the case where the sound-transmitting membrane 1 is present in a path through which sounds are transmitted and the case where the sound-transmitting membrane 1 is not present in a path through which sounds are transmitted. In addition, the sound-transmitting membrane 1 exhibits such acoustic characteristics that the ratio of the insertion loss for sounds of 3000 Hz to the insertion loss for sounds of 1000 Hz is 1.0 to 2.0. Thus, the sound-transmitting membrane 1 can exhibit similar levels of insertion loss for both sounds of 1000 Hz and sounds of 3000 Hz. In the sound-transmitting membrane 1, the ratio of the insertion loss for sounds of 3000 Hz to the insertion loss for sounds of 1000 Hz is preferably 1.0 to 1.5, and more preferably 1.0 to 1.2. Furthermore, the sound-transmitting membrane 1 exhibits such acoustic characteristics that the difference between the maximum value of the insertion loss and the minimum value of the insertion loss for sounds of 100 Hz to 4000 Hz is 5 dB or less. Therefore, the sound-transmitting membrane 1 can exhibit such acoustic characteristics that the insertion loss does not vary much for sounds in a frequency range of 100 Hz to 4000 Hz.

The recovery rate R of the sound-transmitting membrane 1, as defined by the following formula, is desirably 80% or more.

Recovery rate $R=(1-(H2/H1))\times 100$

H1 is the maximum displacement of the sound-transmitting membrane 1 from a reference plane, as measured after the sound-transmitting membrane 1 having a peripheral portion attached to a plate so as to cover a through hole formed in the plate is subjected to a continuous water pressure of 50 kPa applied for 60 minutes to one surface of the sound-transmitting membrane attached to the plate. H2 is the maximum displacement of the sound-transmitting membrane 1 from the reference plane, as measured after the sound-transmitting membrane 1 is allowed to stand at atmospheric pressure for 360 minutes following the application of the water pressure. Here, the reference plane is the plane of the other surface of the sound-transmitting membrane 1 including the peripheral portion. The recovery rate R indicates the ease of recovery from the deformation of the sound-transmitting membrane 1 under water pressure. Since the recovery rate R of the sound-transmitting membrane 1 is 80% or more, its shape is easy to recover from the deformation under water pressure. Therefore, the sound-transmitting membrane 1 can be reused even after being repeatedly subjected to water pressure and thus has excellent durability. Desirably, the recovery rate R of the sound-transmitting membrane 1 is 90% or more.

Figure 2:
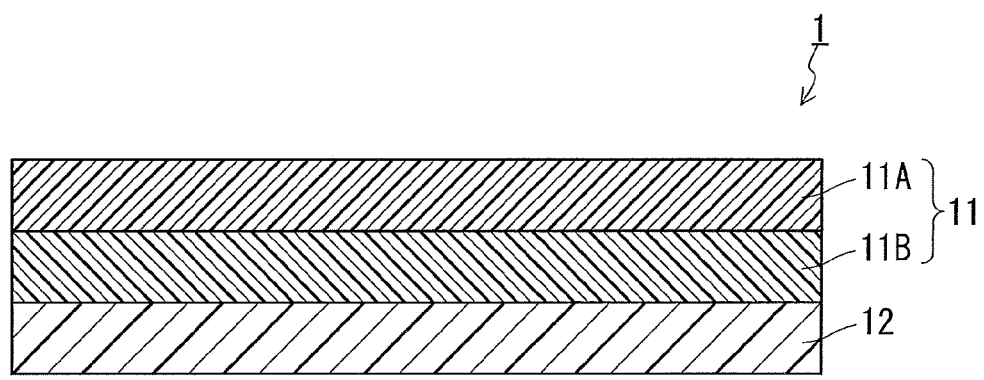
FIG. 2 is a cross-sectional view of another embodiment of the sound-transmitting membrane of the present invention.

As shown in FIG. 2, the porous resin membrane 11 of the sound-transmitting membrane 1 may have a multilayer structure of two porous resin membranes, for example. The porous resin membrane 11 has a multilayer structure of a first porous resin membrane 11A and a second porous resin membrane 11B. In addition, as described above, each of the first porous resin membrane 11A and the second porous resin membrane 11B has a porous structure in which innumerable spaces formed between fine fibers (fibrils) of PTFE serve as pores. The first porous resin membrane 11A or the second porous resin membrane 11B may be colored any desired color or may not be colored.

Favorably, the first porous resin membrane 11A forming one principal surface of the sound-transmitting membrane 1 is colored black, for example. In this case, if the sound-transmitting membrane 1 is disposed at an opening of a housing of an electronic device in such a manner that the first porous resin membrane 11A is exposed to the outside of the housing, the sound-transmitting membrane 1 is less conspicuous. The sound-transmitting membrane 1 may have a multilayer structure of three or more porous resin membranes. In this case, it is favorable that a porous resin membrane forming one principal surface of the sound-transmitting membrane 1 be colored according to the color (e.g., black) of the housing. In addition, the first porous resin membrane 11A or the second porous resin membrane 11B may be subjected to liquid-repellent treatment.

It is favorable that the average pore diameter of each of the first porous resin membrane 11A and the second porous resin membrane 11B be within the range described above for the average pore diameter of the porous resin membrane 11. The average pore diameter of the first porous resin membrane 11A and that of the second porous resin membrane 11B may be equal to or different from each other. In addition, from the standpoint of ensuring the sound transmissibility, the surface density of the porous resin membrane 11 composed of two or more porous resin membranes is preferably 2 to 10 g/cm$^2$, more preferably 2 to 8 g/cm$^2$, and even more preferably 2 to 5 g/cm$^2$.

The porous resin membrane 11 may have a single-layer structure as shown in FIG. 1. With this structure, the surface density of the sound-transmitting membrane 1 can be minimized. Accordingly, the sound transmission loss is reduced, and thus the sound transmissibility of the sound-transmitting membrane 1 is improved.

Figure 3:
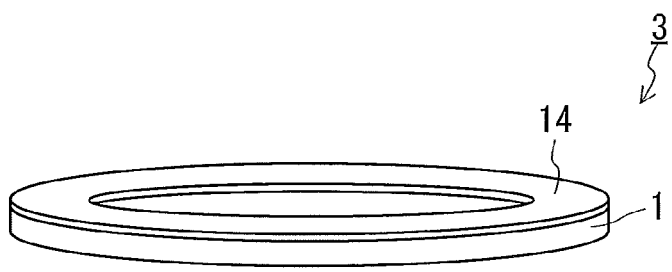
FIG. 3 is a perspective view of an embodiment of a sound-transmitting member of the present invention.

As shown in FIG. 3, a sound-transmitting member 3 may be formed by attaching a ring-shaped reinforcing member 14 to the peripheral portion of the sound-transmitting membrane 1. With this structure, the sound-transmitting membrane 1 can be reinforced, and the handleability of the sound-transmitting member 3 is improved. In addition, since the reinforcing member 14 serves as a portion to be attached to a housing, the efficiency of attaching the sound-transmitting membrane 1 to the housing is improved. The shape of the reinforcing member 14 is not particularly limited as long as it can support the sound-transmitting membrane 1. The material of the reinforcing member 14 is not particularly limited, and a resin, a metal, or a composite material thereof can be used. The method for joining the sound-transmitting membrane 1 and the reinforcing member 14 together is not particularly limited. Examples of methods that can be employed include heat welding, ultrasonic welding, bonding using an adhesive agent, and bonding using a double-sided adhesive tape.

An electronic device according to the present embodiment includes a sound emitter or a sound receiver. A speaker, a buzzer, and the like, can be given as examples of the sound emitter. A microphone and the like can be given as examples of the sound receiver. The electronic device has a housing in which an opening is formed so as to correspond to this sound emitter or the sound receiver. The above-described sound-transmitting membrane is disposed so as to cover the opening corresponding to the sound emitter or the sound receiver, and thereby the electronic device of the present embodiment is formed.

Figure 4A:
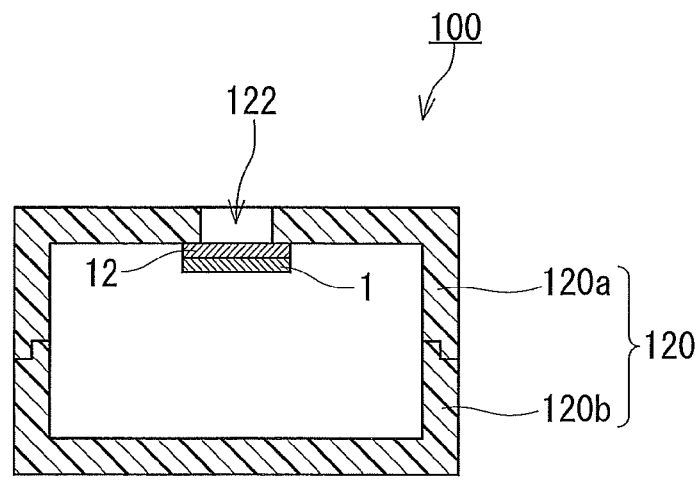
FIG. 4A is a cross-sectional view of a sound-transmitting structure of the present invention.

Next, a sound-transmitting structure 100 of the present invention is described. As shown in FIG. 4A, the sound-transmitting structure 100 includes the above-described sound-transmitting membrane 1 and a case 120. The case 120 has a sound-transmitting opening 122. The sound-transmitting membrane 1 covers the sound-transmitting opening 122 with the supporting member 12 welded to the case. The case 120 includes an upper case 120a and a lower case 120b. The upper case 120a is assembled with the lower case 120b, and thereby the case 120 is formed. The sound-transmitting opening 122 is formed in the upper case 120a.

Figure 4B:
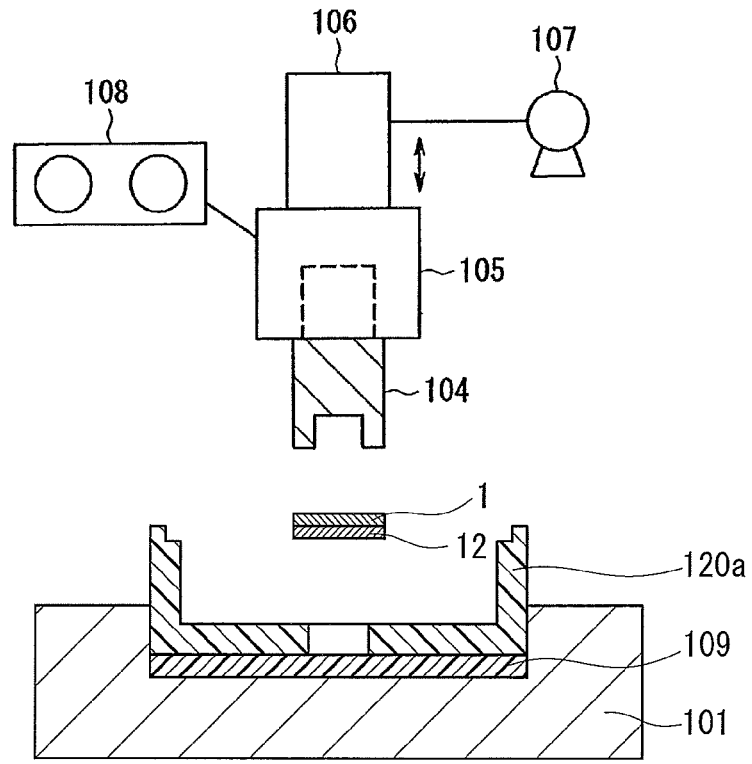
FIG. 4B is a schematic diagram showing a method for welding a sound-transmitting membrane.

As shown in FIG. 4B, the sound-transmitting membrane 1 is welded to the case 120 by a welding apparatus including a fixing base 101, an elastic body 109, a welding horn 104, a heater 105, a temperature controller 108, an air lifter 106, and an air compressor 107. A recessed portion for fixing the upper case 120a is formed in the center of the fixing base 101, and the elastic body 109 is placed on the bottom of the recessed portion. The welding horn 104 has an annular protruding portion formed at its front end, and the surface of this protruding portion serves as a heat welding surface. The upper part of the welding horn 104 is fitted in the heater 105, and the temperature controller 108 is connected to the heater 105. The air lifter 106 is attached to the part of the welding horn fitted in the heater 105. The air lifter 106 is connected to the air compressor 107 and moves the welding horn 104 up and down by compressed air.

Welding of the sound-transmitting membrane 1 to the case 120 using the above-described welding apparatus is performed in the following manner, for example. First, the elastic body 109 is placed on the bottom of the recessed portion of the fixing base 101, and the upper case 120a is fitted into the recessed portion in such a manner that the elastic body 109 and the surface of the upper case 120a having the sound-transmitting opening 122 are in contact with each other, and then fixed to the fixing base 101. Next, the sound-transmitting membrane 1 is placed over the sound-transmitting opening 122 of the fixed upper case 120a in such a manner that the supporting member 12 is in contact with the upper case 120a. The welding horn 104 is heated by the heater 105, with the heating temperature being controlled by the temperature controller 108. The heating temperature is determined as appropriate depending on the material of the supporting member 12 or the material of the upper case 120a. The heating temperature is, for example, 120 to 200° C. The welding horn 104 is moved downward by the air lifter 106 so as to bring the surface of its annular protruding portion serving as the heat welding surface into contact with the peripheral portion of the sound-transmitting membrane 1. Then, the sound-transmitting membrane 1 is heated under pressure and thereby the peripheral portion of the sound-transmitting membrane 1 and the portion around the sound-transmitting opening 122 of the upper case 120a are welded together. After welding is completed, the welding horn 104 is moved upward by the air lifter 106. Then, the lower case 120 is assembled with the upper case 120a with the sound-transmitting membrane 1 welded thereto, and thus the sound-transmitting structure 100 can be obtained.

Instead of the above-mentioned heat welding, laser welding may be used as long as the sound-transmitting membrane 1 can be welded to the case 120 so as to cover the sound-transmitting opening 122.

Figure 5A:
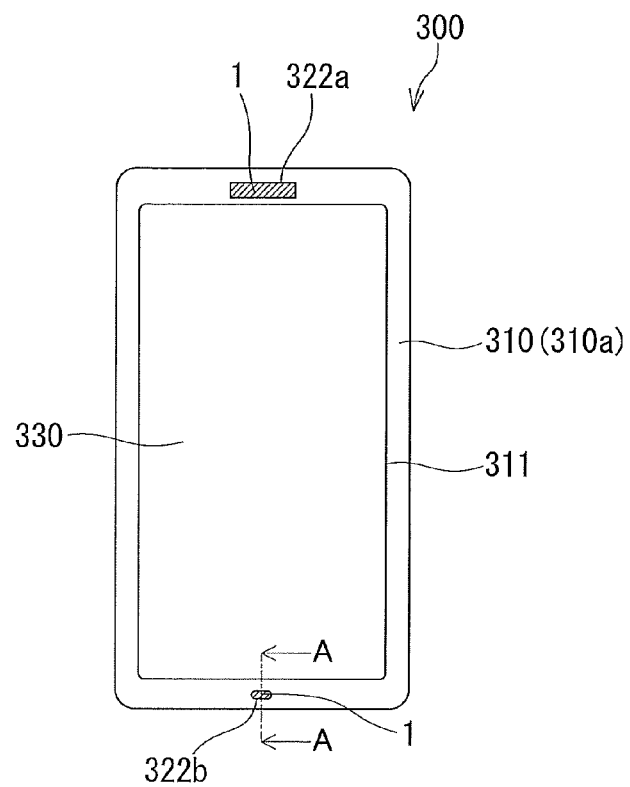
FIG. 5A is a front view of a waterproof case of the present invention.
Figure 5B:
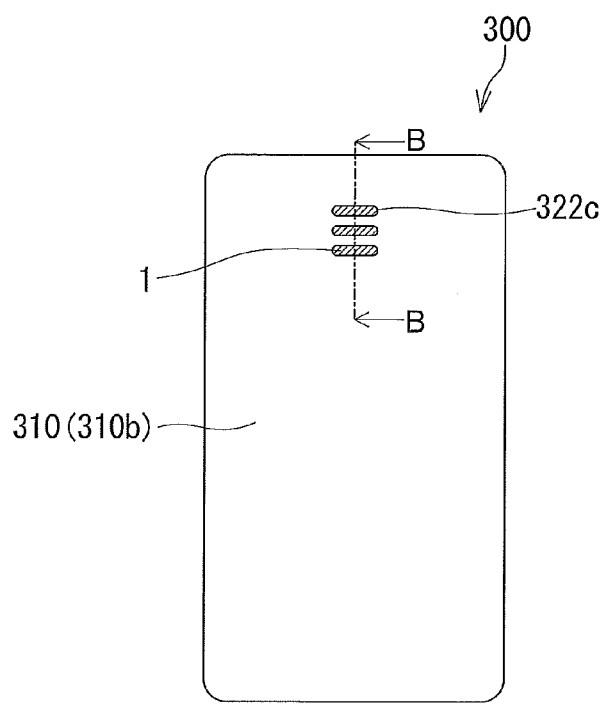
FIG. 5B is a back view of the waterproof case shown in FIG. 5A.
Figure 6A:
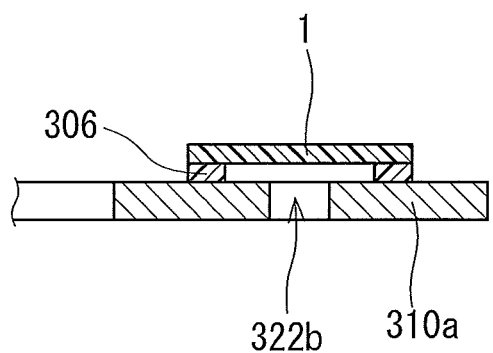
FIG. 6A is a cross-sectional view taken along the line A-A in FIG. 5A.
Figure 6B:
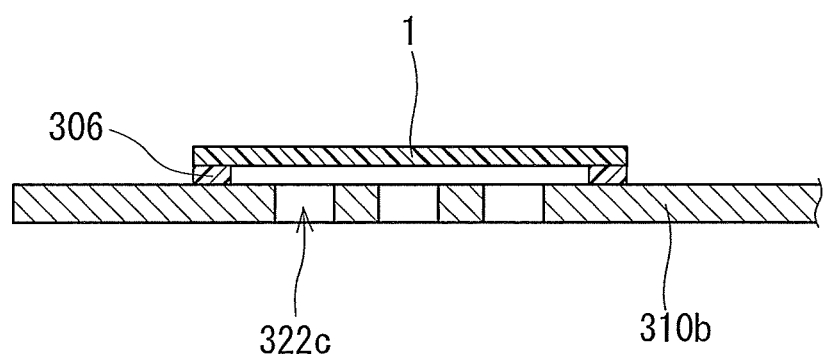
FIG. 6B is a cross-sectional view taken along the line B-B in FIG. 5B.

Next, a waterproof case of the present invention is described. As shown in FIG. 5A and FIG. 5B, the waterproof case includes the above-described sound-transmitting membrane 1 and a case 300. The case 300 includes a frame 310 and an elastic transparent film 330. The frame 310 has an upper frame 310a and a lower frame 310b. The upper frame 310a is a thin plate structure having a rectangular outline and having a rectangular opening formed in the center thereof. The upper frame 310a has a sound-transmitting opening 322a, a sound-transmitting opening 322b, and an operation opening 311. The lower frame 310b is a bottomed box having an upper opening, and has a sound-transmitting opening 322c in the bottom thereof. The elastic transparent film 330 is attached to the upper frame 310a so as to cover the operation opening 311. The elastic transparent film 330 is, for example, a polyurethane sheet, a silicone rubber sheet, a styrene-based elastomer sheet, or a polyisoprene sheet. As shown in FIG. 6A, the sound-transmitting membrane 1 is joined to the upper frame 310a with a double-sided adhesive tape 306 interposed therebetween so as to cover the sound-transmitting opening 322b. Likewise, the sound-transmitting membrane 1 is joined to the upper frame 310a with a double-sided adhesive tape 306 interposed therebetween so as to cover the sound-transmitting opening 322a. As shown in FIG. 6B, the sound-transmitting membrane 1 is joined to the lower frame 310b with a double-sided adhesive tape 306 interposed therebetween so as to cover the sound-transmitting opening 322c.

Figure 7A:
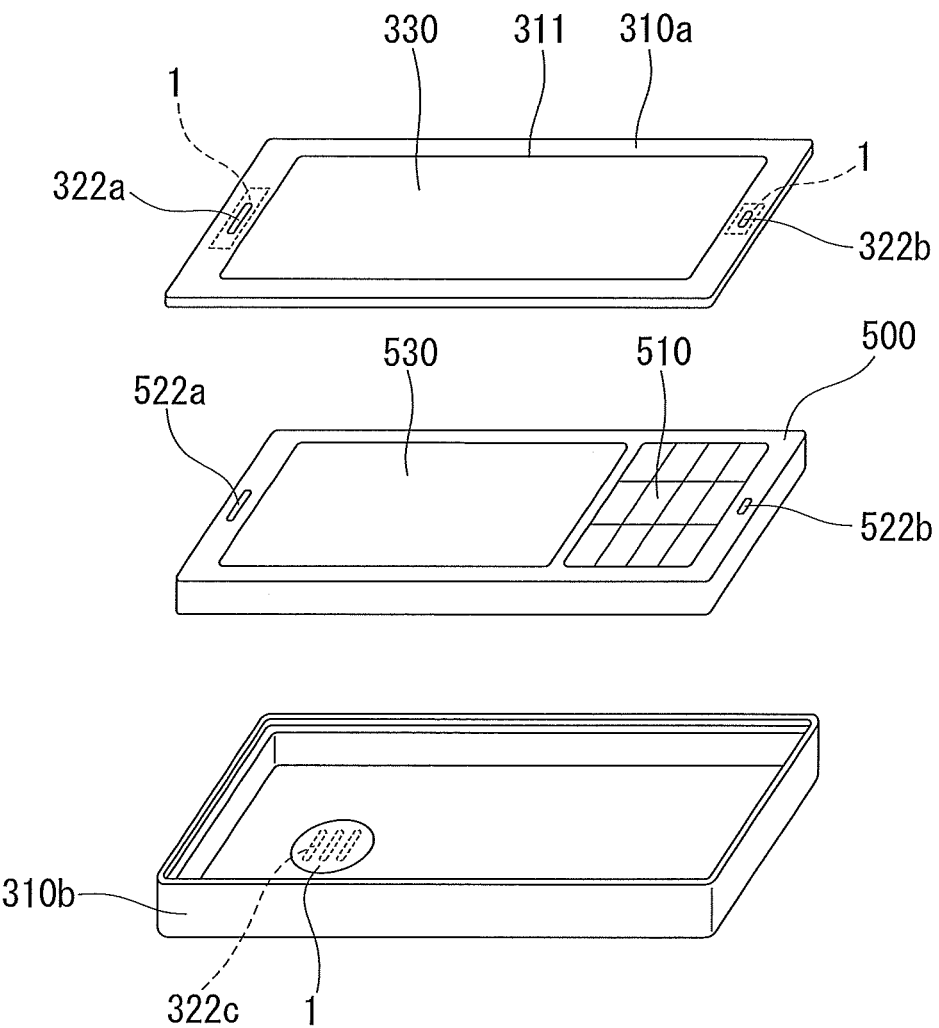
FIG. 7A is a top perspective view showing an arrangement of a waterproof case and an electronic device.
Figure 7B:
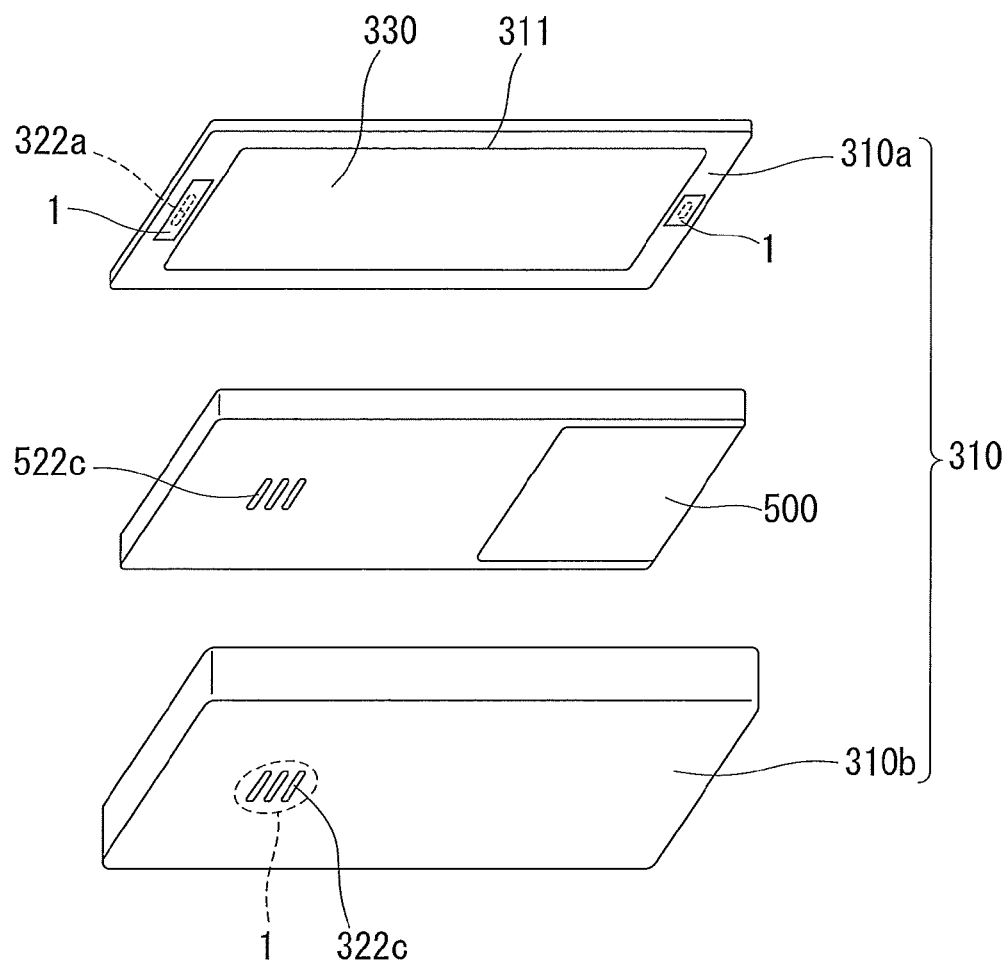
FIG. 7B is a bottom perspective view showing the arrangement of the waterproof case and the electronic device.

The upper frame 310a and the lower frame 310b are assembled together so that the upper frame 310a covers the opening of the lower frame 310b, and thus the interior of the case 300 is protected from ingress of water. Therefore, if an electronic device 500 such as a mobile phone is disposed between the upper frame 310a and the lower frame 310b, as shown in FIG. 7A or FIG. 7B, so as to set the electronic device 500 within the case 300, the electronic device 500 can be used in environments that require the device 500 to be waterproof.

When the electronic device 500 is set in the case 300, the sound-transmitting opening 322a is located in a region corresponding to a sound port 522a for a speaker of the electronic device 500. When the electronic device 500 is set in the case 300, the sound-transmitting opening 322b is located in a region corresponding to a sound port 522b for a microphone of the electronic device 500. When the electronic device 500 is set in the case 300, the sound-transmitting opening 322c is located in a region corresponding to a sound port 522c for another speaker of the electronic device 500. Thus, when the electronic device 500 is set in the case 300, sounds are transmitted between the speaker or the microphone of the electronic device 500 and the outside of the case 300. Therefore, a user can use the speaker or the microphone of the electronic device 500 set in the case 300.

When the electronic device 500 is set in the case 300, the elastic transparent film 330 is in contact with the electronic device 500 so as to cover operation keys 510 and a display 530 of the electronic device 500. The user can operate the operation keys 510 through the elastic transparent film 330 and can visually recognize the display 530 through the elastic film 330. In the case where the display 530 is a touch panel display, the user can operate the display 530 through the elastic transparent film 330. Therefore, the user can operate the electronic device 500 set in the case 300.

EXAMPLES

The present invention will be described in detail with reference to Examples. The following Examples are merely illustrative of the present invention, and the present invention is not limited to the following Examples. First, the method for evaluating porous resin membranes or sound-transmitting membranes according to Examples and Comparative Examples will be described.

<Air Permeability>

The air permeability of each porous resin membrane or sound-transmitting membrane was evaluated in accordance with the method B (Gurley method) of air permeability measurement methods specified in JIS (Japanese Industrial Standards) L 1096.

<Water Entry Pressure>

The water entry pressure of each porous resin membrane or sound-transmitting membrane was measured using a water penetration testing device (high hydraulic pressure method) specified in JIS L 1092:2009. However, when a specimen of the porous resin membrane has an area specified in JIS L 1092, the membrane is significantly deformed. Therefore, a stainless steel mesh (opening diameter=2 mm) was provided on a surface of the porous resin membrane opposite to a surface subjected to a pressure so as to reduce the deformation of the porous resin membrane to some extent, and then the water entry pressure of the membrane was measured.

<Displacement at Water Pressure of 50 kPa>

Figure 8A:
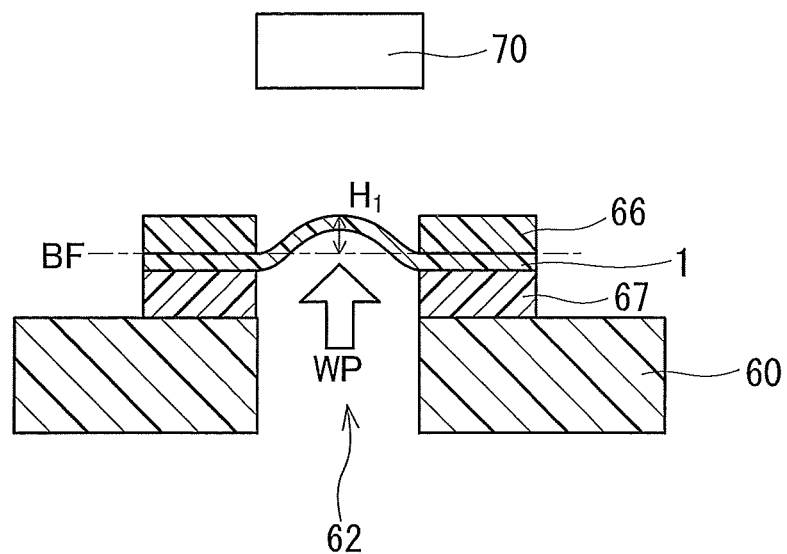
FIG. 8A is a cross-sectional view schematically illustrating the maximum displacement H1 of the sound-transmitting membrane.

As shown in FIG. 8A, the peripheral portion of the sound-transmitting membrane 1 was attached to a plate 60 with a double-sided adhesive tape 67 (Model No. 5620A manufactured by Nitto Denko Corporation) so as to cover a 2.5-mm diameter through hole 62 formed in the plate 60, and then the sound-transmitting membrane 1 was subjected to a water pressure WP applied to one surface of the membrane 1 attached to the plate 60 using a water penetration testing device (high hydraulic pressure method) specified in JIS L 1092:2009. After the water pressure applied reached 50 kPa, the sound-transmitting membrane 1 was subjected to a continuous water pressure WP of 50 kPa for 60 minutes, and then the displacement of the membrane 1 from the reference plane BF of the membrane 1, that is, from the plane of the other surface of the membrane 1 including the peripheral portion, was measured using a CCD laser displacement meter 70 (LK-G87 manufactured by Keyence Corporation) disposed on the side of the other surface of the membrane 1 opposite to the surface subjected to the water pressure WP. The maximum value of the displacement measured was defined as the maximum displacement H1. The peripheral portion of the sound-transmitting membrane 1 was reinforced with a ring-shaped reinforcing member 66 made of polyethylene terephthalate (PET).

<Recovery Rate>

Figure 8B:
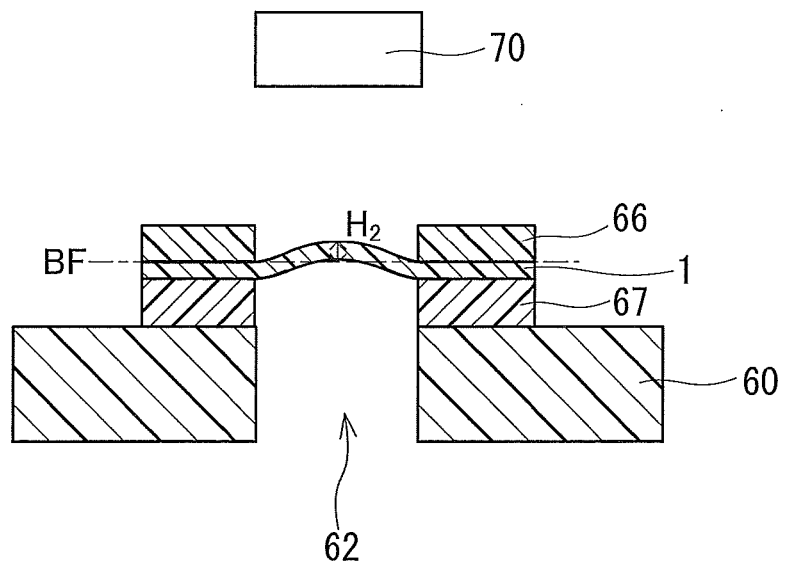
FIG. 8B is a cross-sectional view schematically illustrating the maximum displacement H2 of the sound-transmitting membrane.

Next, the application of the water pressure WP to the sound-transmitting membrane 1 was stopped, and then the membrane 1 was allowed to stand at atmospheric pressure for 360 minutes. As shown in FIG. 8, the displacement of the sound-transmitting membrane 1 from the reference plane BF of the membrane 1 including the peripheral portion at this point was measured using the CCD laser displacement meter 70. The maximum value of the displacement measured was defined as the maximum displacement H2. The recovery rate R was calculated by the following formula:

Recovery rate $R=(1-(H2/H1))\times 100$

<Liquid Repellency>

Each porous resin membrane was placed on a sheet of copy paper (regular paper). One drop of lamp oil was applied to the porous resin membrane on the sheet of copy paper using a dropper, and then the membrane and the sheet were left for 1 minute. Thereafter, the porous resin membrane was removed, and the condition of the sheet of copy paper was checked. In the case where the sheet of copy paper was wet with the oil lamp, it was determined that the porous resin membrane had no liquid repellency, while in the case where the sheet of copy paper was not wet, it was determined that the porous resin membrane had liquid repellency.

<Acoustic Characteristics>

Figure 9:
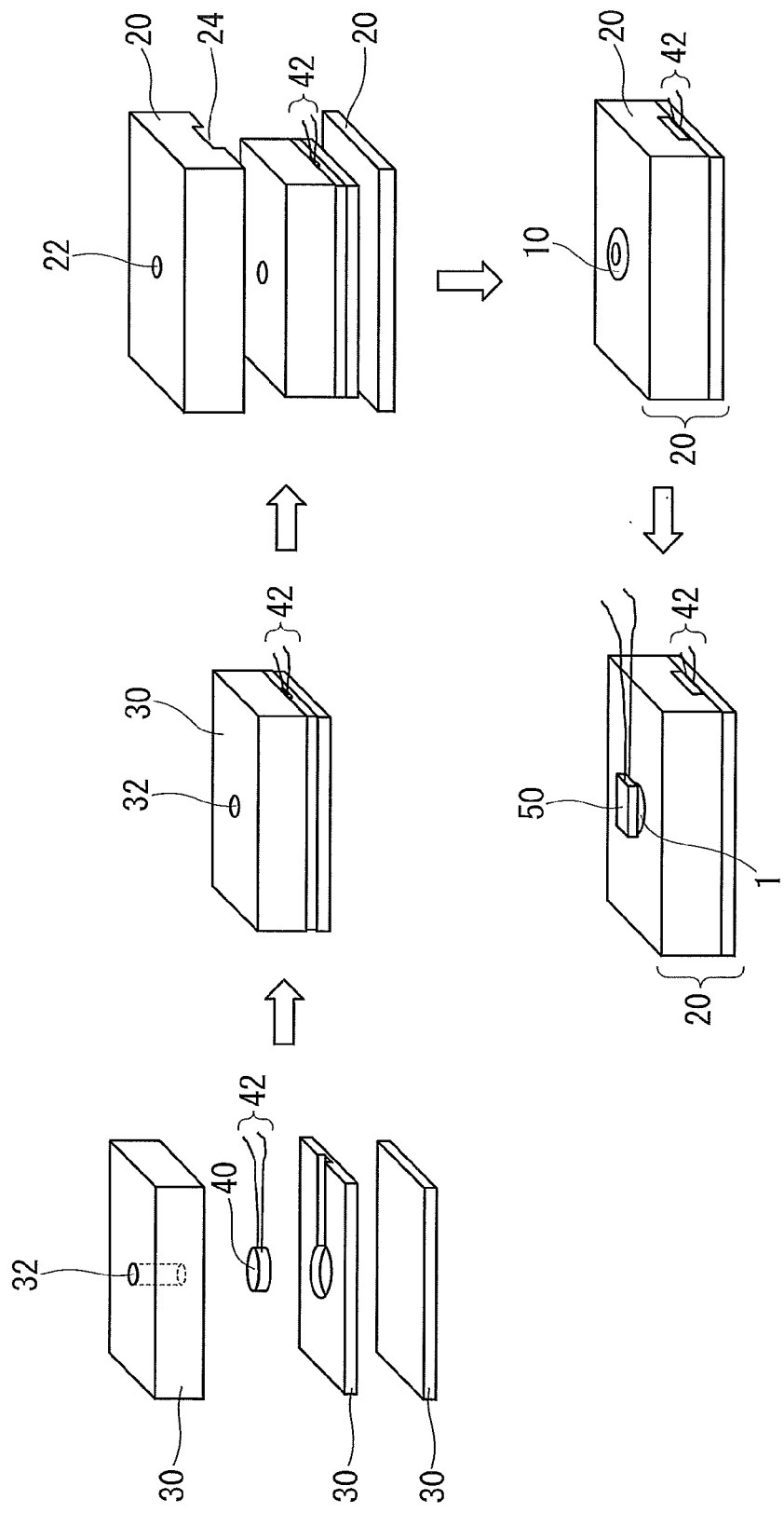
FIG. 9 is a process diagram showing the steps of measuring the acoustic characteristics of the sound-transmitting membrane.

The acoustic characteristics of the fabricated sound-transmitting membranes were evaluated as described below. First, as shown in FIG. 9, a simulated housing 20 made of polystyrene (outer dimensions of 60 mm×50 mm×28 mm) intended to be used as a housing of a mobile phone was prepared. This simulated housing 20 was provided with a speaker mounting hole 22 with a diameter of 2 mm and a guide hole 24 for a speaker cable 42. No other opening than these holes was provided in this simulated housing 20. Next, as shown in FIG. 9, a speaker 40 (SCG-16A manufactured by Star Micronics Co., Ltd.) was attached to an urethane foam filling material 30 having a sound-transmitting hole 32 with a diameter of 5 mm, and then was enclosed in the simulated housing 20. The speaker cable 42 was guided to the outside of the simulated housing 20 through the guide hole 24. Then, the guide hole 24 was sealed with putty.

Figure 10:
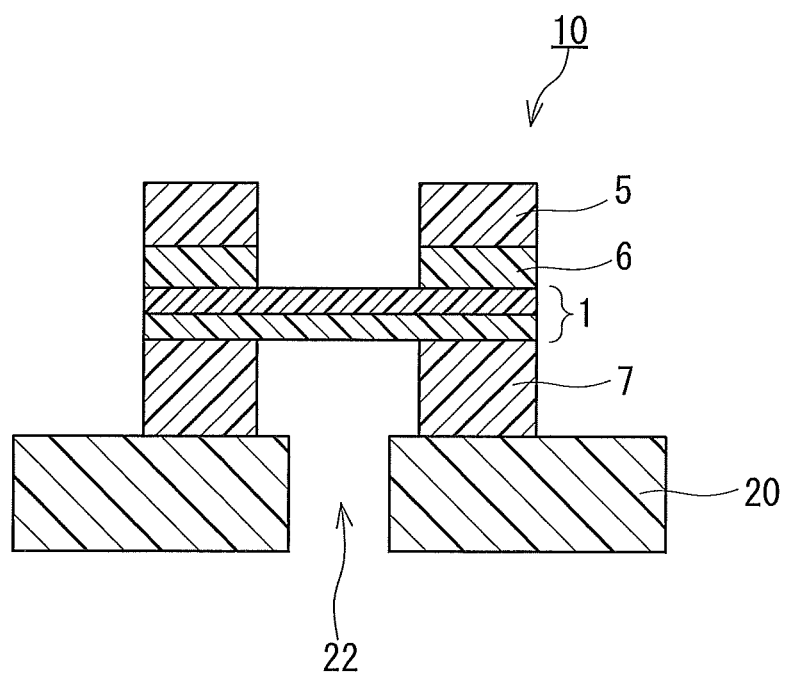
FIG. 10 is a cross-sectional view illustrating the location of the sound-transmitting membrane in the measurement of the acoustic characteristics.

Next, as shown in FIG. 10, the sound-transmitting membrane 1 of each of Examples and Comparative Examples was die-cut into a piece with a diameter of 5.8 mm, and a PET film 5 with a thickness of 0.1 mm, a double-sided adhesive tape 6 as a PET supporting member (No. 5603 manufactured by Nitto Denko Corporation, with a thickness of 0.03 mm), and a double-sided adhesive tape 7 as a polyethylene foam supporting member (No. 57120B manufactured by Nitto Denko Corporation, with a thickness of 0.20 mm) were each die-cut into pieces with an inner diameter of 2.5 mm and an outer diameter of 5.8 mm. Using these pieces, an evaluation sample 10 was prepared. Then, the evaluation sample 10 was attached to the simulated housing 20 to cover the speaker mounting hole 22 from outside. The sound-transmitting membrane 1 was attached to the simulated housing 20 so as to completely cover the speaker mounting hole 22 without any gap between the double-sided adhesive tape 7 and the simulated housing 20 and between the sound-transmitting membrane 1 and the double-sided adhesive tape 7.

Next, a microphone 50 (Spm0405Hd4H-W8 manufactured by Knowles Acoustics) was placed over the sound-transmitting membrane 1 so as to cover the sound-transmitting membrane 1, and the microphone 50 was connected to an acoustic evaluation apparatus (Multi-analyzer System 3560-B-030 manufactured by B&K Corporation). The distance between the speaker 40 and the microphone 50 was 21 mm. Next, SSR analysis (test signal: 20 Hz to 10 kHz, sweep) was selected as an evaluation method and performed, and the acoustic characteristics (insertion loss) of the sound-transmitting membrane 1 were evaluated. When a sound pressure level was measured in a blank state where a through hole having a diameter of 2.5 mm was formed by breaking the sound-transmitting membrane 1 of the sample, the blank sound pressure level was −21 dB at 1000 Hz. The insertion loss was automatically obtained from a signal received by the microphone 50 and the test signal inputted from the acoustic evaluation apparatus to the speaker 40. The insertion loss was obtained by subtracting, from the sound pressure level in the above-mentioned blank state, the sound pressure level measured in the presence of the sound-transmitting membrane 1 attached. The smaller value of the insertion loss indicates that the level of the sound outputted from the speaker 40 was maintained better.

<Welding Test>

In order to determine whether or not the sound-transmitting membrane according to each Example could be welded to the case, the membrane was tested using the welding apparatus shown in FIG. 4B to determine whether or not it could be welded to a polybutylene terephthalate case to cover a through hole of the case. The sound-transmitting membrane was disposed in the case in such a manner that the supporting member (nonwoven fabric) of the membrane was in contact with the case.

Example 1

100 parts by weight of PTFE fine powder (F-104 manufactured by Daikin Industries, Ltd.) and 20 parts by weight of n-dodecane (manufactured by Japan Energy Corporation) serving as a forming aid were uniformly mixed with each other. The obtained mixture was compressed by a cylinder, and then was formed into a sheet-shaped mixture by ram extrusion. Next, the sheet-shaped mixture obtained was passed through a pair of metal rolls and thus rolled to a thickness of 0.16 mm. Furthermore, the mixture was dried by heating at 150° C. to remove the forming aid. A sheet-shaped body of PTFE was thus obtained.

Next, the sheet-shaped body obtained was stretched in the longitudinal direction (the rolling direction) at a stretching temperature of 260° C. at a stretching ratio of 10, and thus a porous PTFE membrane was obtained. The porous PTFE membrane was immersed, for several seconds, in a dye solution obtained by mixing 20 parts by weight of a black dye (SP BLACK 91-L manufactured by Orient Chemical Industries Co., Ltd., a 25 weight % solution diluted with ethanol) and 80 parts by weight of ethanol (purity=95%) as a solvent for the dye. Thereafter, the entire porous PTFE membrane was heated to 100° C. and thereby dried to remove the solvent. Thus, a porous PTFE membrane dyed black was obtained.

Next, the porous PTFE membrane prepared as described above was immersed in a liquid-repellent treatment solution for several seconds. Thereafter, the porous PTFE membrane was heated at 100° C. and dried to remove the solvent. A porous PTFE membrane having been subjected to liquid-repellent treatment was thus obtained. The liquid-repellent treatment solution was prepared as described below. 100 g of a compound having a linear fluoroalkyl group and represented by the following (Formula 1), 0.1 g of azobisisobutyronitrile serving as a polymerization initiator, and 300 g of a solvent (FS thinner manufactured by Shin-Etsu Chemical Co., Ltd.) were put into a flask fitted with a nitrogen introducing pipe, a thermometer, and a stirrer. A nitrogen gas was introduced to allow addition polymerization to proceed under stirring at 70° C. for 16 hours. As a result, 80 g of a fluorine-containing polymer was obtained. This fluorine-containing polymer had a number average molecular weight of 100000. The liquid-repellent treatment solution was prepared by diluting the fluorine-containing polymer with a diluent (FS thinner manufactured by Shin-Etsu Chemical Co., Ltd.) to a concentration of 3.0% by mass.

$$CH_2=CHCOOCH_2CH_2C_6F_{13}$$ (Formula 1)

Next, the porous PTFE membrane having been subjected to liquid-repellent treatment was stretched in the width direction at a stretching temperature of 150° C. at a stretching ratio of 10. Furthermore, the entire porous PTFE membrane was baked at 360° C. which is higher than the melting point (327° C.) of PTFE to obtain a porous resin membrane (porous PTFE membrane) according to Example 1. The obtained porous resin membrane had an average pore diameter of 0.5 μm, a surface density of 5 g/m², an air permeability of 1.0 sec/100 mL, and a water entry pressure of 80 kPa.

Next, the obtained porous resin membrane and a nonwoven fabric (fiber diameter: 10 to 15 pin, surface density: 5 g/m²) made of ethylene vinyl acetate (EVA) resin (ethylene vinyl acetate elastomer) were laminated to each other by hot pressing. A sound-transmitting membrane according to Example 1 was thus obtained. Here, the lamination was performed by applying pressure for 2 seconds under the conditions of a heating temperature of 200° C. and a pressure of 0.5 MPa. In addition, the nonwoven fabric made of EVA resin was obtained by heating and melting an EVA resin at 200° C. and applying the molten EVA resin onto a 0.075 mm-thick PET release film in fibrous form at a pressure of 5 kg/cm². The sound-transmitting membrane thus obtained exhibited the following characteristics: a surface density of 10 g/cm², an air permeability of 2.0 sec/100 mL, a water entry pressure of 110 kPa, and "being liquid repellent".

Example 2

A sound-transmitting membrane according to Example 2 was obtained in the same manner as in Example 1 except that a nonwoven fabric made of EVA resin (ethylene vinyl acetate elastomer) and having a surface density of 10 g/cm² and a fiber diameter of 10 to 15 μm was used.

Example 3

A sound-transmitting membrane according to Example 3 was obtained in the same manner as in Example 1 except that a nonwoven fabric made of EVA resin (ethylene vinyl acetate elastomer) and having a surface density of 15 g/cm² and a fiber diameter of 10 to 15 μm was used.

Example 4

A sound-transmitting membrane according to Example 4 was obtained in the same manner as in Example 1 except that a nonwoven fabric (Espansione FF manufactured by KB Seiren Ltd.) made of polyurethane resin (polyurethane elastomer) and having a surface density of 25 g/cm² and a fiber diameter of 25 to 30 μm was used.

Example 5

A sound-transmitting membrane according to Example 5 was obtained in the same manner as in Example 1 except that a nonwoven fabric (STRAFLEX P PN5065R manufactured by Idemitsu Unitech Co., Ltd.) made of polyamide-based elastomer resin and having a surface density of 40 g/cm² and a fiber diameter of 18 to 25 μm was used.

Comparative Example 1

A sound-transmitting membrane according to Comparative Example 1 was obtained in the same manner as in Example 1 except that a nonwoven fabric (HOP6 manufactured by Hirose Paper Mfg Co., Ltd.) composed of core-clad fibers of polypropylene (PP) and polyethylene (PE) and having a surface density of 6 g/cm² and a fiber diameter of 20 to 22 μm was used.

Comparative Example 2

A sound-transmitting membrane according to Comparative Example 2 was obtained in the same manner as in Example 1 except that a nonwoven fabric (Eleves TO303WDO manufactured by Unitika Ltd.) composed of core-clad fibers of polyethylene terephthalate (PET) and polyethylene (PE) and having a surface density of 30 g/cm² and a fiber diameter of 20 to 25 μm was used.

In Examples 2 to 5 and Comparative Examples 1 and 2, the lamination was performed at a temperature adjusted to be appropriate for the material of each nonwoven fabric, and the heating time and the applied pressure were the same as in Example 1.

Comparative Example 3

A two-part heat-curing silicone resin (manufactured by Dow Corning Toray Co., Ltd.) diluted with toluene was cast onto a silicone release separator (MRS50 manufactured by Mitsubishi Plastics, Inc.), and then a thin film was formed using an applicator. The thin film of silicone resin was disposed on a porous resin membrane fabricated in the same manner as in Example 1, and then they were heated and dried to obtain a layered product of the silicone resin sheet and the porous resin membrane (porous PTFE membrane). In this manner, a sound-transmitting membrane according to Comparative Example 3 was obtained.

Figure 11:
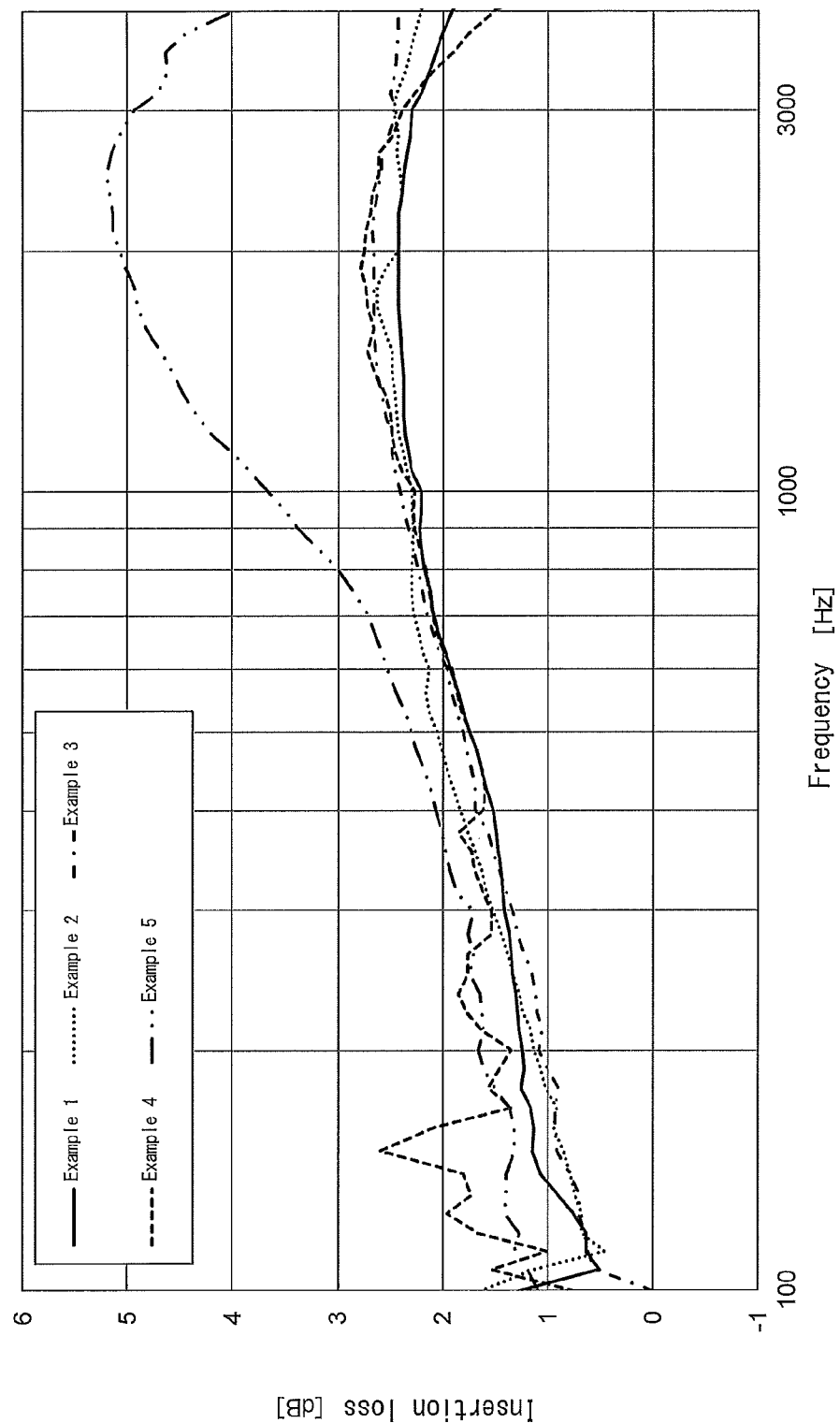
FIG. 11 is a graph showing the acoustic characteristics of sound-transmitting membranes according to Examples.
Figure 12:
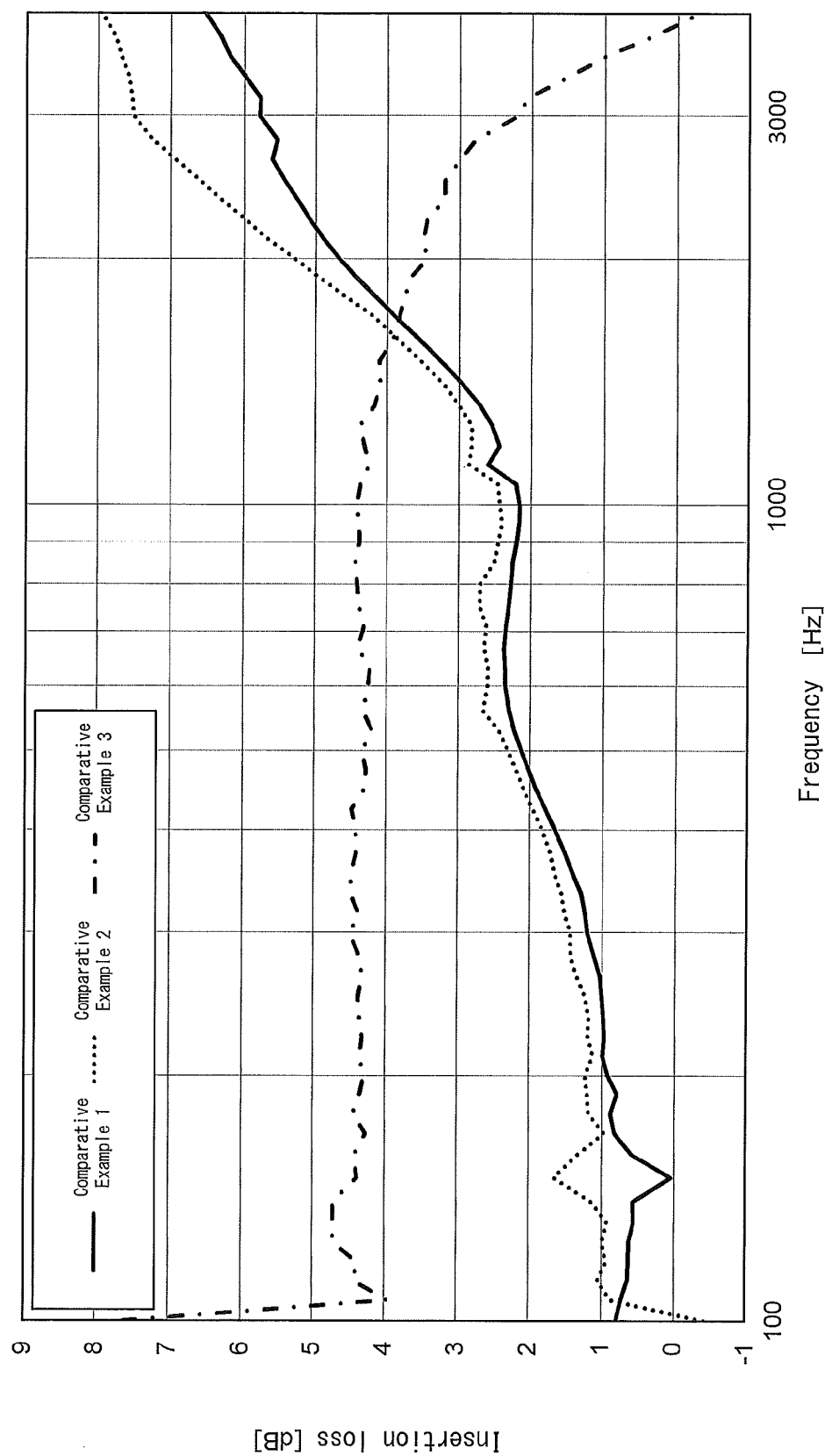
FIG. 12 is a graph showing the acoustic characteristics of sound-transmitting membranes according to Comparative Examples.

Table 1 shows the characteristics of the sound-transmitting membranes according to Examples and Comparative Examples. In addition, FIG. 11 shows a graph showing the relationship between the sound frequency and the insertion loss in Examples 1 to 5, and FIG. 12 shows a graph showing the relationship between the sound frequency and the insertion loss in Comparative Examples 1 to 3.

As shown in Table 1, in all of the sound-transmitting membranes according to Examples 1 to 5, the insertion loss for sounds of 3000 Hz was 5 dB or less. In addition, the ratio of the insertion loss for sounds of 3000 Hz to the insertion loss for sounds of 1000 Hz in the sound-transmitting membranes according to Examples 1 to 5 was 1.00 to 1.32. In other words, the sound-transmitting membranes according to Examples 1 to 5 exhibited similar levels of insertion loss for both sounds of 1000 Hz and sounds of 3000 Hz. Furthermore, in the sound-transmitting membranes according to Examples 1 to 5, the difference between the maximum value of insertion loss and the minimum value of insertion loss of 100 Hz to 4000 Hz was 1.92 to 4.11 dB. This suggested that the sound-transmitting membranes according to Examples 1 to 5 exhibited such acoustic characteristics that the insertion loss did not vary much for sounds in a frequency range of 100 Hz to 4000 Hz.

Furthermore, as shown in Table 1, the recovery rates R of the sound-transmitting membranes according to Examples 1 to 5 were 91.8% to 98.4%. This result suggested that the sound-transmitting membranes according to Examples 1 to 5 could easily recover from deformation under water pressure and could be reused even after being repeatedly subjected to water pressure. On the other hand, the recovery rates R of the sound-transmitting membranes according to Comparative Examples 1 and 2 were lower, which suggested that the sound-transmitting membranes according to Comparative Examples 1 and 2 were less likely to recover from deformation under water pressure.

TABLE 1

| | Surface density [g/m²] | Air permeability [sec/100 mL] | Water entry pressure [kPa] | Displacement [mm] H1 | Displacement [mm] H2 | Recovery rate R [%] | Insertion loss [dB] 1000 Hz | Insertion loss [dB] 3000 Hz | Insertion loss ratio |
|---|---|---|---|---|---|---|---|---|---|
| Example 1 | 10 | 2.0 | 110 | 0.52 | 0.01 | 98.4 | 2.2 | 2.3 | 1.05 |
| Example 2 | 15 | 2.2 | 110 | 0.46 | 0.01 | 98.2 | 2.3 | 2.5 | 1.09 |
| Example 3 | 20 | 2.3 | 120 | 0.42 | 0.02 | 96.1 | 2.4 | 2.4 | 1.00 |
| Example 4 | 30 | 2.0 | 120 | 0.40 | 0.04 | 91.8 | 2.3 | 2.4 | 1.04 |
| Example 5 | 45 | 2.0 | 120 | 0.40 | 0.02 | 96.2 | 3.7 | 4.9 | 1.32 |
| Com. Example 1 | 11 | 0.7 | 140 | 0.32 | 0.22 | 41.3 | 2.2 | 5.8 | 2.64 |
| Com. Example 2 | 35 | 1.1 | 140 | 0.27 | 0.17 | 48.4 | 2.4 | 7.5 | 3.13 |
| Com. Example 3 | 55 | No air permeability | 200 | 0.63 | — | — | 4.4 | 2.2 | 0.50 |

As a result of the welding test, the sound-transmitting membranes of Examples 1 to 3 and 5 could be welded to a polybutyl terephthalate case under the conditions of 200° C. for 3 seconds. The sound-transmitting membrane of Example 4 could be welded to a polybutyl terephthalate case under the conditions of 120° C. for 3 seconds. It was found that the sound-transmitting membranes according to Examples 1 to 5 could be welded to a case in such a manner that a nonwoven fabric supporting member was in contact with the case. Therefore, the sound-transmitting membrane can be attached to the case without using a double-sided adhesive tape, an adhesive agent, or the like.

The invention claimed is:

1. A sound-transmitting structure comprising:
    a sound-transmitting membrane that allows passage of sounds and prevents passage of foreign matters; and
    a case having a sound-transmitting opening,
    wherein the sound-transmitting membrane comprises:
        a supporting member that is a nonwoven fabric whose fibers are made of an elastomer; and
        a porous resin membrane disposed on the supporting member and comprising polytetrafluoroethylene as a main component,
    the sound-transmitting membrane covers the sound-transmitting opening of the case with the supporting member that is welded to the case, and
    a ratio of an insertion loss for sounds of 3,000 Hz of the sound-transmitting membrane relative to an insertion loss for sounds of 1,000 Hz thereof is in a range from 1.0 to 2.0.

2. The sound-transmitting structure according to claim 1, wherein the supporting member is laminated on the porous resin membrane over at least an entire portion thereof that covers the sound-transmitting opening.

3. The sound-transmitting structure according to claim 1, wherein the fibers of the nonwoven fabric consist of the elastomer.

* * * * *